(12) United States Patent
Hattori et al.

(10) Patent No.: US 6,624,415 B1
(45) Date of Patent: Sep. 23, 2003

(54) MEASURING METHOD AND DEVICE FOR RADIOACTIVITY, RADIOACTIVE CONCENTRATION AND RADIOACTIVITY SURFACE CONCENTRATION

(75) Inventors: Takatoshi Hattori, Tokyo (JP); Takeshi Ichiji, Tokyo (JP)

(73) Assignee: Central Research Institute of Electric Power Industry, Tokyo (JP)

( * ) Notice: Subject to any disclaimer, the term of this patent is extended or adjusted under 35 U.S.C. 154(b) by 0 days.

(21) Appl. No.: 09/914,174

(22) PCT Filed: Nov. 15, 1999

(86) PCT No.: PCT/JP99/06356

§ 371 (c)(1),
(2), (4) Date: Aug. 24, 2001

(87) PCT Pub. No.: WO00/54071

PCT Pub. Date: Sep. 14, 2000

(30) Foreign Application Priority Data

Mar. 9, 1999 (JP) ............................................. 11-062266

(51) Int. Cl.$^7$ ................................................. G01T 1/16
(52) U.S. Cl. ................................. 250/336.1; 250/363.02
(58) Field of Search ......................... 250/336.1, 363.02, 250/363.04; 378/22, 901; 382/131

(56) References Cited

U.S. PATENT DOCUMENTS 5,591,977 A * 1/1997 Green et al. ............ 250/363.03

FOREIGN PATENT DOCUMENTS

| JP | 2-31146 | 2/1990 | ......... G01N/23/225 |
| JP | 5-74808 | 3/1993 | ......... H01L/21/336 |

OTHER PUBLICATIONS

Sakashita, Tetsuya et al., *Journal of Health Physics*, "Simulation of Diurnal Variation of Atmospheric $^{222}$Rn Concentrations with Three–dimensional Atmospheric Dispersion Model," 1996, vol. 31, No. 2, pp. 161–168.

Japan Atomic Energy Research Institute, "New Development of Studies for Environmental Changes of Radioactive Materials," Mar. 1993, pp. 119–134.

* cited by examiner

*Primary Examiner*—Constantine Hannaher
*Assistant Examiner*—Timothy J. Moran
(74) *Attorney, Agent, or Firm*—Notaro & Michalos P.C.

(57) ABSTRACT

A method and an apparatus for obtaining radioactivity, radioactivity concentration and radioactivity surface density without using an actual calibration radiation source but utilizing a γ ray, including: a virtual modeling step (21) for arranging virtual three-dimensional models of a measurement subject and a radiation detector in a virtual three-dimensional space with the same positional relationship as an actual geometric positional relationship; a conversion factor setting step which is a step for associating the number of times of generation of a virtual radiation ray emitted from a virtual three-dimensional model of the measurement subject with the number of times of incidence of the virtual radiation ray upon a virtual three-dimensional model of the radiation detector to obtain a conversion factor, and has a virtual count calculating step (22) and a conversion factor calculating step (23); an actual counting rate calculating step (24) for actually counting the incidence of the radiation ray emitted from the measurement subject upon the radiation detector to obtain a counting rate; and a radioactivity calculating step (25) for calculating radioactivity of the measurement subject from the counting rate and the conversion factor.

12 Claims, 10 Drawing Sheets

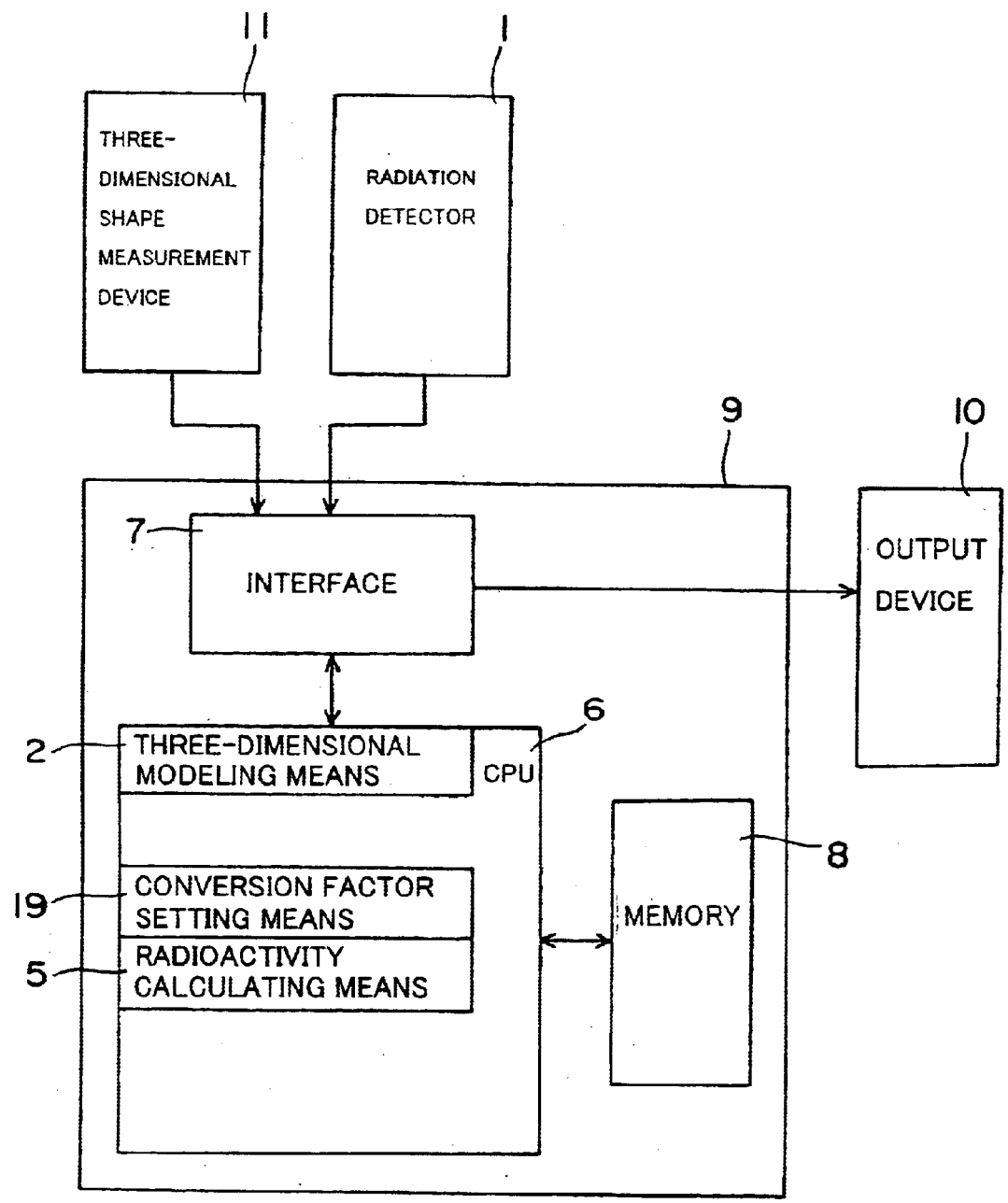

MEASURING METHOD AND DEVICE FOR RADIOACTIVITY, RADIOACTIVE CONCENTRATION AND RADIOACTIVITY SURFACE CONCENTRATION

FIELD OF THE INVENTION

The present invention relates to a method and an apparatus for measuring radioactivity, radioactivity concentration and radioactivity surface density. More particularly, the present invention relates to a radioactivity measuring method for measuring radioactivity by obtaining a conversion factor without using an actual calibration radiation source and a measuring apparatus for carrying out this method and a measuring method and a measuring apparatus for measuring radioactivity concentration and a method and an apparatus for measuring radioactivity surface density based on the radioactivity measured by the former method and apparatus.

DESCRIPTION OF THE RELATED ART

In order to obtain the radioactivity concentration or the radioactivity surface density of a measurement subject such as demolition wastes and the like of nuclear facilities, the radioactivity of the measurement subject must be first obtained. In a conventional radioactivity measurement method, a conversion factor for calculating the radioactivity from a counting rate obtained from a count of a radioactivity detector is acquired by comparison with a conversion factor obtained by separately preparing a calibration radiation source whose radioactivity is already known and actually performing measurement.

Further, although the radioactivity of the surface of the measurement subject must be first measured in order to measure the radioactivity surface density of the measurement subject, it is general to use a β ray having the weaker penetrability than that of a γ ray in order to measure the radioactivity of the surface. That is, when the γ ray having the stronger penetrability than that of the ⊖ ray is a target of measurement, it is difficult to determine whether the measured γ ray is emitted from the surface of the measurement subject or emitted from the inside, and hence the γ ray is inappropriate for measurement of the radioactivity of the surface of the measurement subject. Therefore, the radioactivity of the surface of the measurement subject with the β ray as a measurement target is measured by using a portable type radioactivity detector called a survey meter specified in JIS (Japanese Industrial Standards) Z 4329 "Portable radioactive surface contamination meter" or an article carrying out monitor specified in JIS Z 4337 "Installed articles surface contamination monitoring assemblies for beta emitters".

However, in the method for measuring the surface radioactivity for obtaining the radioactivity surface density mentioned above, since the surface radioactivity is measured by measuring the β ray by using the survey meter, the survey meter can not be inserted into a narrow tube when the measurement subject is, for example, a metal narrow tube. Accordingly, measurement of the radioactivity of the inner peripheral surface of the narrow tube is difficult.

Furthermore, in the radioactivity measurement method with the γ ray having the stronger penetrability than that of the β ray being a target of measurement, a conversion factor for calculating the radioactivity is obtained by comparison with the conversion factor acquired by performing actual measurement by using a calibration radiation source. Therefore, in order to accurately obtain the radioactivity of the measurement subject, an optimum calibration radiation source must be produced in accordance with a shape or a dimension of the measurement subject, and this method is not appropriate for the radioactivity measurement of the measurement subjects having different shapes or dimensions. For example, in case of measuring the radioactivity of demolition wastes and the like of nuclear facilities, it is difficult to produce each optimum calibration radiation source for each waste in nature because wastes having various shapes and dimensions are mixed. Thus, this method is hardly applied to the radioactivity measurement of the demolition wastes generated in volume.

It is an object of the present invention to provide a method and an apparatus for measuring the radioactivity, a method and an apparatus for measuring the radioactivity concentration, and a method and an apparatus for measuring the radioactivity surface density, which do not require an actual calibration radiation source, respectively. Further, it is another object of the present invention to provide a method and an apparatus for measuring the radioactivity surface density capable of obtaining the radioactivity surface density by utilizing a γ ray having the stronger penetrability than that of a β ray.

SUMMARY OF THE INVENTION

To achieve this aim, according to the present invention, there is provided a method for measuring the radioactivity comprising: a virtual modeling step for arranging virtual three-dimensional models of a measurement subject and a radiation detector in a virtual three-dimensional space with the same positional relationship as an actual geometric positional relationship; a conversion factor setting step for associating the number of times of gene ration of a virtual radiation ray emitted from the virtual three-dimensional model of the measurement subject with the number of times of incidence of the virtual radiation ray upon the virtual three-dimensional model of the radiation detector and obtaining a conversion factor; an actual counting rate calculating step for calculating a counting rate by actually counting the number of times of incidence of the radiation rays emitted from the measurement subject upon the radiation detector; and a radioactivity calculating step for calculating the radioactivity of the measurement subject from the counting rate and the conversion factor.

Here, the interaction of the radiation ray and a substance is generated with a given probability, and the conversion factor can be obtained by recreating this phenomenon in the pseudo-manner even if actual measurement using the actual calibration radiation source is not used. That is, the conversion factor can be obtained by virtually recreating the three-dimensional shapes and position relationship of the measurement subject and the radiation detector and associating the number of times of generation of the virtual radiation ray emitted from the virtual three-dimensional model of the measurement subject with the number of times of incidence of the virtual radiation ray upon the virtual three-dimensional model of the radiation detector based on the recreation. Further, the actual radioactivity of the measurement subject can be calculated by the obtained conversion factor and the count by the actual radiation detector.

In case of this radioactivity measurement method, it is preferable that the conversion factor setting step includes: a virtual count calculating step for randomly generating a virtual radiation ray from the virtual three-dimensional model of the measurement subject by utilizing the Monte Carlo calculational technique, and for counting the number of times of incidence of the virtual radiation ray upon the virtual three-dimensional model of the radiation detector to obtain a virtual count; and a conversion factor calculating step for obtaining a conversion factor from the number of times of generation of the virtual radiation ray and the virtual count.

By utilizing the Monte Carlo calculational technique, the three-dimensional shapes and positional relationship of the measurement subject and the radiation detector can be virtually recreated, and it is possible to simulate how the virtual radiation ray randomly generated from the virtual three-dimensional model of the measurement subject enters on the virtual three-dimensional model of the radiation detector.

In this case, since a generation rate of the virtual radiation ray from the virtual three-dimensional model of the measurement subject corresponds to the radioactivity of that virtual three-dimensional model, the conversion factor can be obtained from the number of times of generation of the virtual radiation ray and the count in the virtual three-dimensional model of the radiation detector. Furthermore, the actual radioactivity of the measurement subject can be calculated based on the obtained conversion factor and the count by the actual radiation detector.

Moreover, according to the radioactivity measurement method of the present invention, the conversion factor setting step can obtain the conversion factor from the correlation of the number of radiation rays approximately calculated before and after passing through a medium based on a thickness of the medium existing between the measurement subject and the radiation detector, an attenuation coefficient of that medium, a buildup factor of that medium, and a distance between the measurement subject and the radiation detector.

For example, in case of examining shield of the radiation ray, the shield calculation is performed by using a point-kernel ray tracing code. In this point-kernel ray tracing code, the number of radiation rays after passing through a given medium I is approximately obtained from a relational expression based on the number of radiation rays $I_0$ before passing through the medium, a thickness d of the medium, an attenuation coefficient $\mu$ of the medium, a buildup factor B of the medium, and a distance r between the radiation source and an evaluation point:

$$I=(1/(4\pi r^2))I_0 Be^{-\mu d}$$

That is, the attenuation coefficient $\mu$ of the medium and the buildup factor B of the medium are determined in accordance with a type of the medium, and the thickness d is determined in accordance with the conformation of the measurement subject, a position of the radioactive contamination and others. If the distance r between the radiation source and the evaluation point is known, the relationship between I and $I_0$ can be approximately derived from the above-described relational expression, and the conversion factor can be obtained from the relationship between I and $I_0$. That is, $I_0$ corresponds to the number of times of generation of the virtual radiation ray emitted from the virtual three-dimensional model of the measurement subject, whilst I corresponds to the number of times of incidence of the virtual radiation ray upon the virtual three-dimensional model of the radiation detector, and $I/I_0$ is thereby the conversion factor. In addition, the actual radioactivity of the measurement subject is calculated by the obtained conversion factor and the count by the actual radiation detector.

According to these radiation measurement methods of the present invention, the conversion factor can be obtained without using the actual calibration radiation source, and the radioactivity of the measurement subject can be accurately and rapidly measured. Therefore, it is possible to liberally and rapidly process the radioactivity measurement of the measurement subjects having various shapes or dimensions. In particular, when obtaining the conversion factor by utilizing the Monte Carlo calculational technique, since the emission phenomenon of the actual radiation ray is simulated, the conversion factor in line with the actual phenomenon can be obtained. Additionally, in case of obtaining the conversion factor based on the relationship between I and $I_0$ calculated by using the point-kernel ray tracing code, since a quantity of calculation is reduced even though the measurement accuracy is lowered as compared with the Monte Carlo calculational technique, the conversion factor can be calculated in a short period of time.

Further, if the radioactivity concentration or the surface density of the measurement subject is obviously even, detection by the radiation detector consisting of one cell can suffice. However, if the radioactivity concentration or the radioactivity surface density is not homogeneous and is unevenly distributed, since an error becomes large with the conversion factor obtained by presupposing the homogenous distribution, it is preferable to obtain the conversion factor taking the maldistribution status (uneven distribution) into consideration. In particular, when a radioactivity level of the measurement subject is low, the radiation detector must be moved to closer to the measurement subject to carry out measurement. In such a case, the maldistribution status of the radioactivity largely affects a value of the conversion factor. In order to be aware of the uneven distribution, it is effective to make the radiation detector as an assembly of a plurality of small detectors (cells), namely, set each one of the radiation detectors as a cell and assemble these cells to obtain one large radiation detector. Furthermore, consideration is given to the measurement subject as if it is divided into parts corresponding to cells of the radiation detector, and the conversion factor is obtained for each cell in accordance with each part. As result, in this conversion factor, the uneven distribution is taken into consideration. With the thus obtained conversion factor, the radioactivity of the measurement subject is obtained in accordance with each part thereof, and the radioactivity of the entire measurement subject based on a sum total of the radioactivity of the respective parts is calculated. Moreover, it is possible to designate a part from which many radiation rays are detected by a large number of cells and estimate the radioactivity concentration and the like in accordance with each part of the designated subject from counting information of each cell.

Therefore, according to the radioactivity measurement method of the present invention, it is preferable that: a radiation detector is made as an assembly of a plurality of cells and a measurement subject is conceptualized as an assembly of parts opposed to the cells; a virtual three-dimensional model of the radiation detector is made as an assembly of a plurality of cells and a virtual three-dimensional model of the measurement subject is made as an assembly of parts in a virtual modeling step; a conversion factor setting step is carried out in accordance with each part of the virtual three-dimensional model of the measurement subject and a conversion factor is obtained for each cell in accordance with each part; an actual counting rate calculating step is carried out in accordance with each cell of the radiation detector and a counting rate is obtained for each cell; and the radioactivity according to each part of the measurement subject is obtained by carrying out a radioactivity calculating step and then the radioactivity of the entire measurement subject is obtained based on the radioactivity of each part. In this case, the accurate evaluation is enabled by obtaining the virtual count for each cell even though the radioactivity is unevenly distributed.

Moreover, according to the present invention, there is provided a radioactivity measurement apparatus comprising: a radiation detector for counting a radiation ray emitted from a measurement subject; three-dimensional modeling means for fetching three-dimensional space coordinates of a surface of a measurement subject and virtually recreating a geometric positional relationship between the measurement subject and the radiation detector by utilizing the fetched coordinate; conversion factor setting means for associating the number of times of generation of a virtual radiation ray emitted from the virtually recreated three-dimensional model of the measurement subject with the number of times of incidence upon the virtually recreated three-dimensional model of the radiation detector and calculating a conversion factor; and radioactivity calculating means for calculating the actual radioactivity of the measurement subject based on an actual counting rate by the radiation detector and the conversion factor.

Therefore, by utilizing the virtual three-dimensional models of the measurement subject and the radiation detector pseudo-recreated by the three-dimensional modeling means, the conversion factor setting means associates the number of times of generation of the virtual radiation rays with the number of times of input to the virtual three-dimensional model of the radiation detector and then obtains the conversion factor. The radioactivity calculating means calculates the actual radioactivity of the measurement subject based on the thus obtained conversion factor and the actually measured counting rate of the radiation detector.

In case of this radioactivity measurement apparatus, it is preferable that the conversion factor setting means includes: simulating means for pseudo-recreating incidence of the virtual radiation ray randomly generated from the three-dimensional model of the measurement subject, upon the virtually recreated three-dimensional model of the radiation detector by utilizing a three-dimensional Monte Carlo calculation code; and conversion factor calculating means for calculating the conversion factor based on the number of times of generation of the virtual radiation ray and a count of incidence of the virtual radiation ray upon the three-dimensional model of the radiation detector.

Additionally, the radioactivity measurement apparatus according to the present invention may calculate the conversion factor from the correlation of the number of radiation rays approximately calculated before and after passing through a medium based on a thickness of the medium existing between the measurement subject and the radiation detector, an attenuation coefficient of the medium, a buildup factor of the medium, and a distance between the measurement subject and the radiation detector.

According to these radioactivity measurement apparatus of the present invention, the radioactivity of the measurement subject can be accurately and rapidly measured by calculating the conversion factor without using the actual calibration radiation source, and especially the measurement apparatus suitable for processing a large quantity of measurement subjects having various shapes or dimensions can be realized. In particular, in case of calculating the conversion factor by utilizing the Monte Carlo calculational code, since the actual emission phenomenon of the radiation ray is simulated, the conversion factor in line with the actual phenomenon can be obtained. Further, in case of calculating the conversion factor from the relationship between I and $I_0$ obtained by using the point-kernel ray tracing code, the conversion factor can be calculated in a short period of time because the calculation amount is small.

Furthermore, in the above measurement apparatus according to the present invention, the radiation detector is an assembly of a plurality of cells, and the three-dimensional modeling means may make a virtual three-dimensional model of the radiation detector as an assembly of a plurality of cells and make a virtual three-dimensional model of the measurement subject as an assembly of parts opposed to the cells. Moreover, the conversion factor setting means may calculate the conversion factor for each cell of the radiation detector in accordance with each part of the measurement subject and obtain the radioactivity of the entire measurement subject based on the radioactivity of each part.

Therefore, the conversion factor can be obtained for each cell of the radiation detector in accordance with each part of the measurement subject, and the radioactivity for each part of the measurement subject can be obtained based on the conversion factors and each counting rate of each cell of the radiation detector actually measured, thereby obtaining the radioactivity of the entire measurement subject.

In addition, the radioactivity concentration measurement method according to the present invention includes: a weight or volume measuring step for measuring a weight or a volume of the measurement subject; and a radioactivity concentration calculating step for calculating the radioactivity concentration by dividing the radioactivity obtained by any of the radioactivity measurement methods mentioned above by the weight or the volume.

The radioactivity concentration can be obtained by dividing he radioactivity of the measurement subject by the weight or the volume. Therefore, the radioactivity concentration can be obtained by dividing the radioactivity of the measurement subject acquired by any of the radioactivity measurement methods mentioned above by the weight or the volume measured by the weight or volume measuring step.

Thus, according to this radioactivity concentration measurement method of this invention, since the radioactivity concentration of the measurement subjects having the various shapes or dimensions can be accurately and rapidly measured, it is possible to rapidly and rationally effect divisional evaluation according to each radioactivity level of the demolition waste which is expected to be generated in high volume by the future nuclear reactor decommissioning.

Additionally, the radioactivity concentration measurement apparatus according to the present invention includes: any of the radioactivity measurement apparatuses mentioned above; weight or volume measuring means for measuring a weight or a volume of a measurement subject; and radioactivity concentration calculating means for calculating the radioactivity concentration by dividing the obtained radioactivity of the measurement subject by the weight or the volume.

The radioactivity concentration can be obtained by dividing the radioactivity of the measurement subject by a weight or a volume of the measurement subject. Therefore, the radioactivity of the measurement subject is obtained by any of the above-described radioactivity measurement apparatuses and a weight or a volume of the measurement subject is obtained by the weight or volume measuring means, respectively. The radioactivity concentration can be calculated by dividing the radioactivity by the weight or the volume by the radioactivity concentration calculating means.

Thus, according to this radioactivity concentration measurement apparatus of the present invention, it is possible to provide the apparatus preferable for carrying out the radioactivity concentration measurement method mentioned above. That is, the radioactivity concentration of the measurement subjects having various shapes or dimensions can be accurately and rapidly measured, and it is possible to rapidly and rationally effect divisional evaluation according to each radioactivity level of the demolition waste which is expected to be generated in high volume by the future nuclear reactor decommissioning.

Furthermore, the radioactivity surface density measurement method according to the present invention includes: a surface area measuring step for measuring a surface area of a measurement subject; and a radioactivity surface density calculating step for calculating the radioactivity surface density by dividing the radioactivity obtained by any of the radioactivity measurement methods mentioned above by the surface area.

The radioactivity surface density can be calculated by dividing the radioactivity of the measurement subject by the surface area. Therefore, the radioactivity surface density can be calculated by dividing the radioactivity of the measurement subject obtained by any of the radioactivity measurement methods mentioned above by the surface area of the measurement subject measured by the surface area measuring step.

Therefore, according to this radioactivity surface density measurement method, since the radioactivity surface density of the measurement subjects having various shapes and dimensions can be accurately and rapidly measured, it is possible to rapidly and rationally effect divisional evaluation according to each radioactivity level of the demolition waste which is expected to be generated in high volume by the future nuclear reactor decommissioning. Moreover, the radioactivity surface density of, for example, the inside of a pipe having a small bore diameter such that the survey meter can not be inserted therein can be accurately and rapidly measured.

In addition, the radioactivity surface density measurement apparatus according to the present invention includes: any of the radioactivity measurement apparatus mentioned above; surface area measuring means for measuring a surface area of a measurement subject; and radioactivity surface density calculating means for calculating the radioactivity surface density by dividing the obtained radioactivity of the measurement subject by the surface area.

The radioactivity surface density can,be calculated by dividing the radioactivity of the measurement subject by the surface area. Therefore, the radioactivity of the measurement subject is obtained by any of the radioactivity measurement apparatuses mentioned above and the surface of the measurement subject is obtained by the surface area measuring means, respectively. The radioactivity surface density can be then calculated by dividing the radioactivity by the surface area by using the radioactivity surface density calculating means.

Thus, according to this radioactivity surface density measurement apparatus of this invention, it is possible to provide an apparatus preferable for carrying out the radioactivity surface density measurement method. That is, the radioactivity surface density of the measurement subjects having various shapes and dimensions can be accurately and rapidly measured, and it is possible to rapidly and rationally effect divisional evaluation according to each radioactivity level of the demolition waste which is expected to be generated in high volume by the future nuclear reactor decommissioning.

Additionally, the radioactivity surface density of, e.g., the inside of a pipe having a small bore diameter such that the survey meter can not be inserted therein can be accurately and rapidly measured.

BRIEF DESCRIPTION OF THE DRAWINGS

FIGS. 3A and 3B are conceptual views showing the positional relationship between a radiation detector and a measurement subject, in which FIG. 3A is a conceptual view showing an actual geometric positional relationship and FIG. 3B is a conceptual view showing a positional relationship virtually made as a three-dimensional model;

FIG. 10 is a schematic block diagram showing another example of the embodiment of the radioactivity measurement apparatus according to the present invention.

BEST MODE FOR CARRYING OUT THE INVENTION

The structure of the present invention will now be described in detail hereinafter based on the best mode shown in the accompanying drawings.

Figure 1:
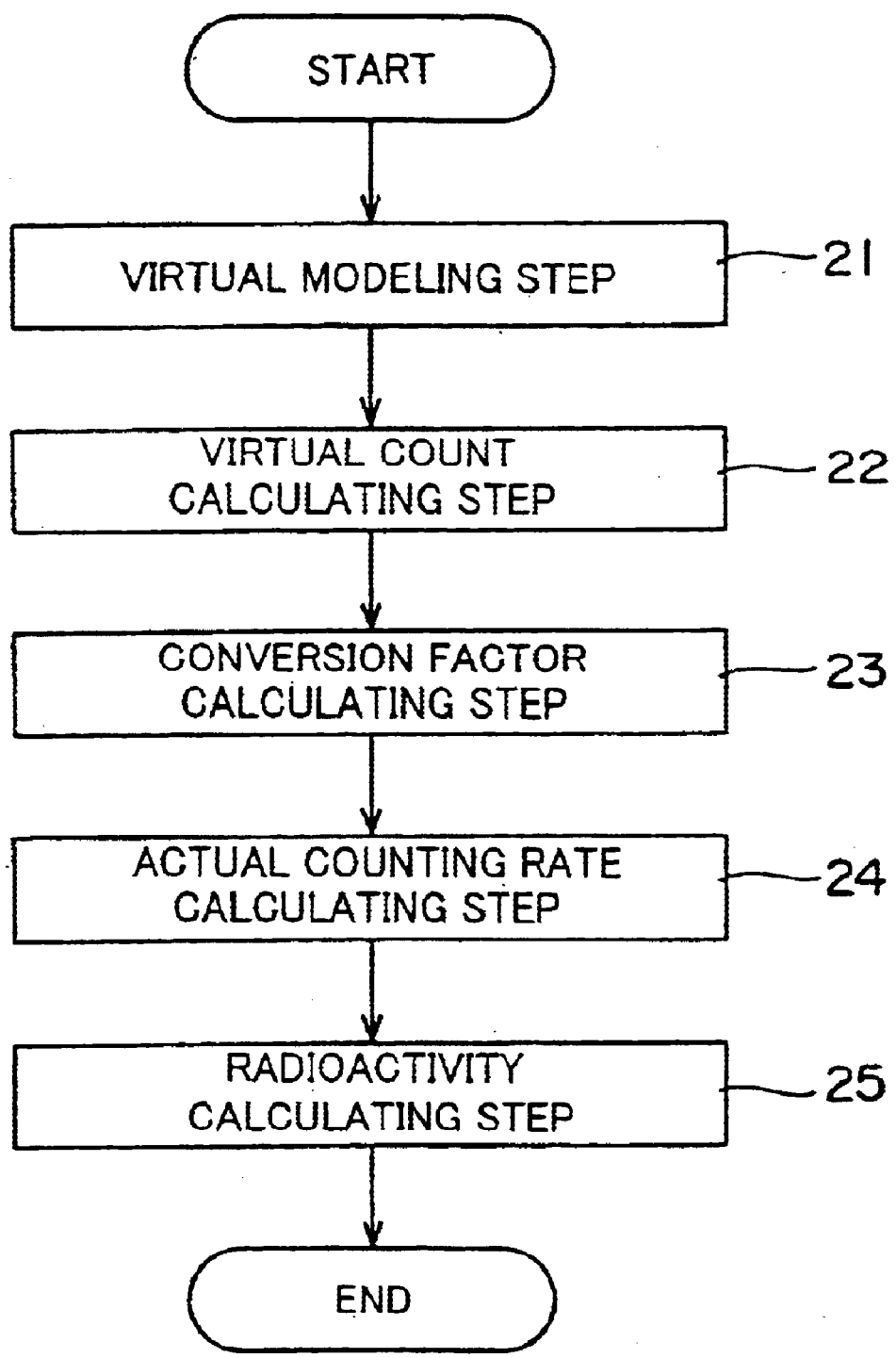
FIG. 1 is a flowchart showing an example of the embodiment of a radioactivity measurement method according to the present invention.
Figure 2:
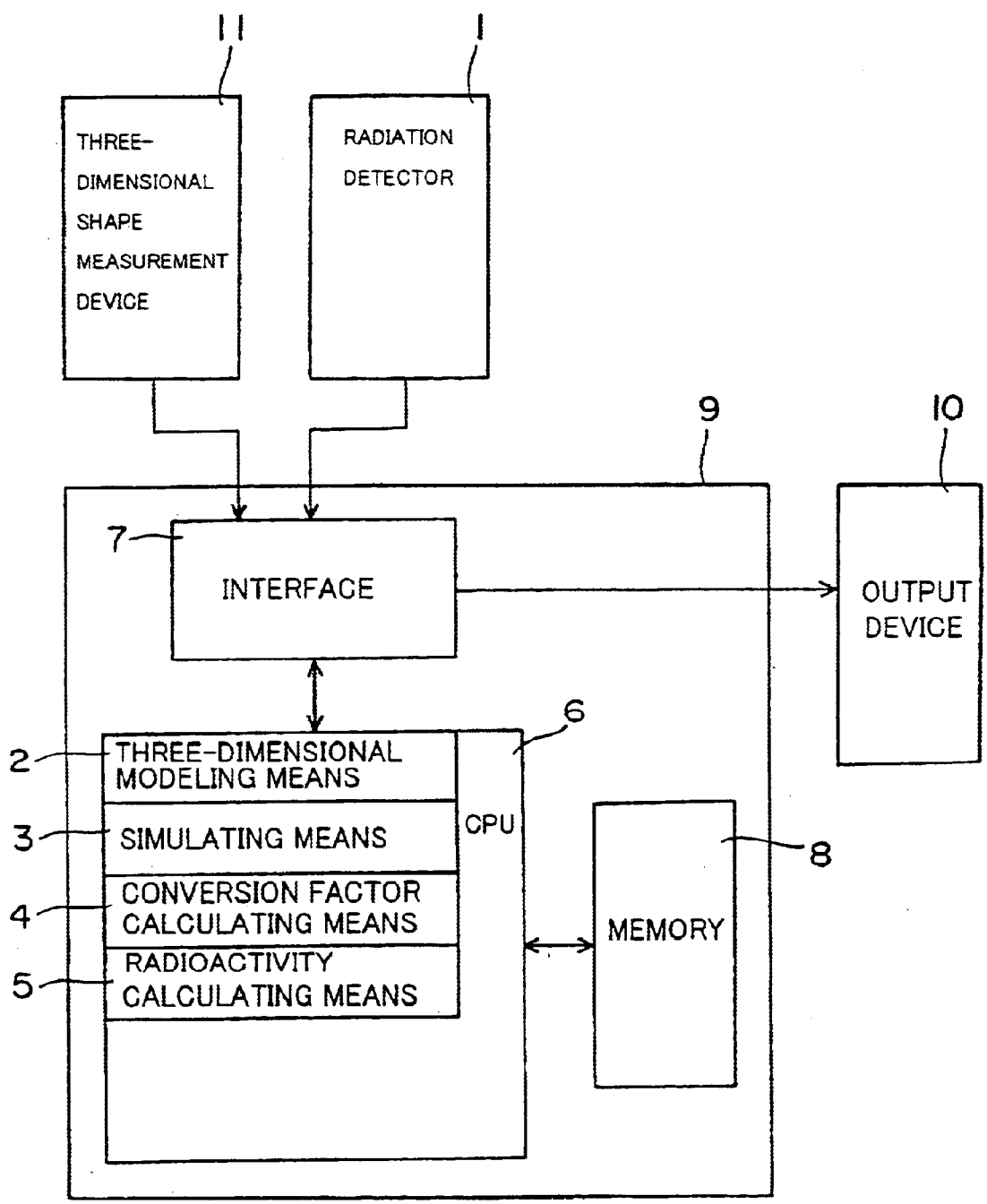
FIG. 2 is a schematic block diagram showing an example of the embodiment of a radioactivity measurement apparatus according to the present invention.
Figure 3A:
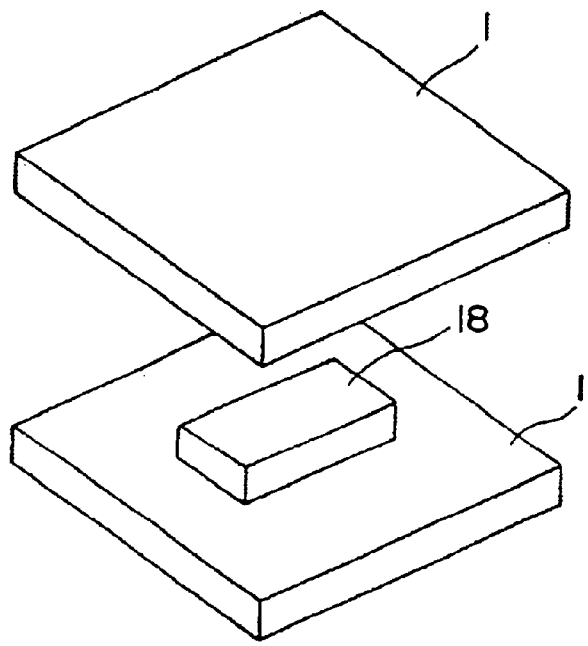
Figure 3B:
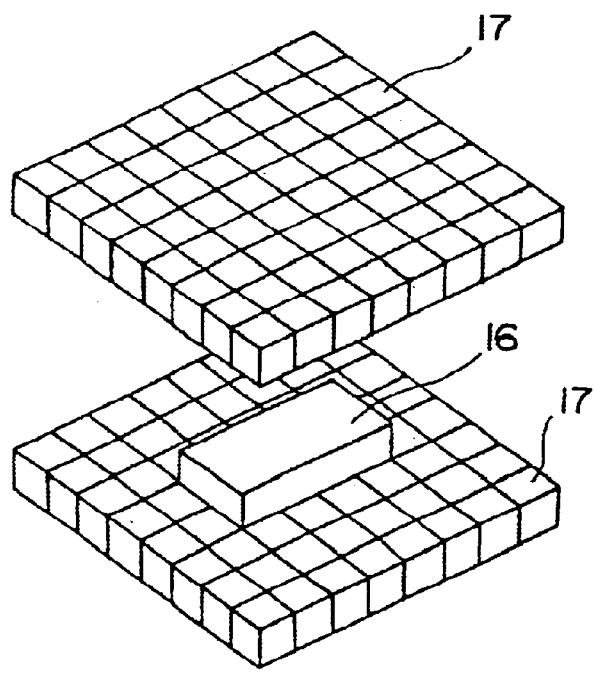

FIG. 1 shows an embodiment of a radioactivity measurement method according to the present invention, and FIG. 2 shows an embodiment of a radioactivity measurement apparatus for carrying out the radioactivity measurement method. This measurement apparatus includes: a radiation detector 1 for counting a radiation ray emitted from a measurement subject 18, e.g., a γ ray; a three-dimensional shape measurement apparatus 11 for measuring a surface shape of the measurement subject 18 and fetching this shape as three-dimensional space coordinates; three-dimensional modeling means 2 for virtually recreating (see FIG. 3B) the geometric positional relationship (see FIG. 3A) of the measurement subject 18 and the radiation detector 1 by utilizing three-dimensional space coordinate data of the surface of the measurement subject obtained by the three-dimensional shape measurement apparatus 11; simulating means 3 for pseudo-recreating incidence of a virtual radiation ray, e.g., a virtual γ ray randomly generated from a virtually recreated three-dimensional model 16 of the measurement subject 18, upon a virtually recreated three-dimensional model 17 of the radiation detector 1; conversion factor calculating means 4 for calculating a conversion factor based on the number of times of generation of the virtual radiation ray and a count of incidence of the virtual radiation ray upon the three-dimensional model 17 of the radiation detector 1; and radioactivity calculating means 5 for calculating the actual radioactivity of the measurement subject 18 based on an actual counting rate by the radiation detector 1 and the conversion factor. That is, in this embodiment, the simulating means 3 and the conversion factor calculating means 4 constitute the conversion factor setting means for obtaining the conversion factor by associating the number of times of generation of the virtual radiation ray emitted from the virtually recreated three-dimensional model 16 of the measurement subject 18 with the number of times of incidence upon the virtual recreated three-dimensional model 17 of the radiation detector 1.

Incidentally, in this embodiment, at least one arithmetic operation processor 6 such as a CPU or an MPU, an interface 7 for inputting/outputting data, a computer 9 provided with a memory 8 for storing a program or data, and a predetermined control or arithmetic operation program realize the three-dimensional modeling means 2, the simulating means 3, the conversion factor calculating means 4 and the radioactivity calculating means 5. That is, the arithmetic operation processor 6 realizes the three-dimensional modeling means 2, the simulating means 3, the conversion factor calculating means 4 and the radioactivity calculating means 5 by using a control program such as an OS stored in the memory 8, a program specifying the procedure of a radioactivity measurement method and the like, necessary data and others. Further, to the computer 9 is connected an output device 10 such as a CRT display or a printer.

As the three-dimensional shape measurement device 11, one for detecting a space coordinate of the surface of the measurement subject 18 as point group data and measuring a three-dimensional shape is used in this embodiment, for example. This three-dimensional shape measurement device 11 scans the surface of the measurement subject 18 by irradiating the measurement subject 18 with a laser beam by a non-contact type three-dimensional laser scanner and forms an image of a scatter light ray in a CCD by a condenser. Furthermore, this device inputs a CCD image formation position as a counter value and converts it into distance data by the principle of the triangular surveying. The point group data with multiple points can be obtained by scanning optical axes of a laser floodlight portion and a photo acceptance portion by a galvanometer mirror at a high speed. The three-dimensional coordinate of the measurement subject 18 measured by this three-dimensional shape measurement device 11 is inputted into the computer 9 through the interface 7. Specifically, the space coordinate of the surface of the measurement subject 18 can be detected at a high speed and obtained as three-dimensional space coordinate data by using, for example, the "three-dimensional scanner TDS3100" manufactured by Pulstec Industrial, Co., Ltd.

As the radiation detector 1, for example, a plastic scintillation detector for measuring a γ ray can be used and arranged above and below the measurement subject 18 in parallel to each other. Counting data obtained by this radiation detector 1 is inputted to the computer 9 through the interface 7.

Subsequently, a radioactivity measurement method will now be described. This radioactivity measurement method includes: a virtual modeling step 21 for fetching three-dimensional space coordinates of the surface of the measurement subject and arranging the virtual three-dimensional models 16 and 17 of the measurement subject 18 and the radiation detector 1 in the virtual three-dimensional space with the same positional relationship as the actual geometric positional relationship by utilizing the fetched coordinate; a virtual count calculating step 22 for randomly generating a virtual radiation ray, for example, a γ ray from the virtual three-dimensional model 16 of the measurement subject 18 and counting the incidence of the virtual radiation ray upon the virtual three-dimensional model 17 of the radiation detector 1 to determine the obtained result as a virtual count; a conversion factor calculating step 23 for obtaining a conversion factor from the number of times of generation of the virtual radiation ray and the virtual count; an actual counting rate calculating step 24 for actually counting the incidence of a radiation ray emitted from the measurement subject 18, e.g., a γ ray upon the radiation detector 1 to obtain a counting rate; and a radioactivity calculating step 25 for obtaining the radioactivity of the measurement subject 18, from the counting rate and the conversion factor. That is, in this embodiment, the virtual count calculating step 22 and the conversion factor calculating step 23 constitute a conversion factor setting step for associating the number of times of generation of the virtual radiation ray emitted from the virtual three-dimensional model 16 of the measurement subject 18 with the number of the incidence of the virtual radiation ray upon the virtual three-dimensional model 17 of the radiation ray detector 1 to obtain a conversion factor.

In this embodiment, the conversion factor is obtained by simulating the phenomenon that the radiation ray is emitted from the measurement subject 18 and counted by the radiation detector 1 by utilizing the three-dimensional Monte Carlo calculational technique carried out on the computer 9 of the measurement apparatus shown in FIG. 2. Accordingly, the virtual modeling step 21 performs so-called three-dimensional modeling that the shape and the geometric positional relationship of the radiation detector 1 and the measurement subject 18 are expressed in formats suitable for the three-dimensional Monte Carlo calculational code in case of counting the radiation ray emitted from the measurement subject 18 by actually using the radiation detector 1 in the actual counting rate calculating step 24. That is, in the virtual modeling step 21, the three-dimensional shapes and the positional relationship of the radiation detector 1 and the measurement subject 18 are first measured by the three-dimensional shape measurement device 11, and their three-dimensional coordinate data is inputted to the three-dimensional modeling means 2. Moreover, as conceptually shown in FIG. 3B for example, the three-dimensional models 16 and 17 of the measurement subject 18 and the radiation detector 1 are virtually recreated in the virtual three-dimensional space and arranged within the same positional relationship as the actual positional relationship. The thus arranged models are expressed in the format of the three-dimensional Monte Carlo calculational code, thereby forming an input file (three-dimensional modeling). In this input file is recorded data concerning at least the conformation of the measurement subject 18, the conformation of the radiation detector 1, and the conformation of any other space medium. As the conformation of the measurement subject 18, there are, for example, a three-dimensional shape, a distribution of the radioactivity contamination (contamination of only the surface, or even contamination extending to the inside, and others), energy of the γ ray to be generated and others. As the conformation of the radiation detector 1, there are, for example, a three-dimensional shape, a composition, density and others. As the conformation of any other space medium, there are, existence/absence of vacuum or air, existence/absence of lead shielding, and others.

Meanwhile, since the data concerning the three-dimensional shape of the radiation detector 1 and the distance/positional relationship between the radiation detector 1 and a reference surface of, e.g., a table on which the measurement subject 18 is mounted do not change even if the shape and the like of the measurement subject 18 vary each time, measurement of the radiation detector 1 by the three-dimensional shape measurement device 11 does not have to be carried out each time, or the labor for performing measurement/input each time by utilizing the previously inputted three-dimensional data can be saved. In this case, the time required for obtaining and inputting the three-dimensional shape data can be shortened.

Subsequently, in the virtual count calculating step 22, the virtual radiation ray is randomly generated from the virtual three-dimensional model 16 of the measurement subject 18 by utilizing the three-dimensional Monte Carlo calculational technique. In addition, among the generated virtual radiation rays, those incident upon the virtual three-dimensional model 17 of the radiation detector 1 are counted, thereby obtaining the count. That is, the γ ray is isotropically (every direction with the equal probability) emitted from a radioactive material, and the emitted γ ray passes through, collides with, or is absorbed by the material and divided into γ rays with the new energy. The interaction of the γ ray and the material is generated with a given probability, and this phenomenon can be approximated and expressed by a mathematical model. With the three-dimensional Monte Carlo calculational code, the γ ray emitted from the virtual three-dimensional model 16 of the measurement subject 18 in every direction isotropically, namely, with the equal probability can be traced on the computer 9 by the simulating means 3 by using the above-described mathematical model. Therefore, the probability (value close to the detection efficiency) of how much the γ ray emitted from the measurement subject 18 enters the radiation detector 1 set at a distanced position can be obtained by calculation. The arithmetic operation processor 6 of the computer 9 as the simulating means 3 simulates how the radiation ray is emitted from the measurement subject 18 by the three-dimensional Monte Carlo calculational code and obtains the count by the radiation detector 1 in the pseudo-manner. It is to be noted that for example, an MCNP code which is an open code developed by Los Alamos National Laboratory in the United States can be used as the three-dimensional Monte Carlo calculational code.

Then, in the conversion factor calculating step 23, the conversion factor is obtained from a ratio of the number of the virtually generated γ rays and a count value counted by the detector model 17 in the conversion factor calculating means 4 realized in the arithmetic operation processor 6 of the computer 9. Assuming that B γ rays enter the virtual three-dimensional model 17 of the radiation detector 1 when A γ rays are generated from the virtual three-dimensional model 16 of the measurement subject 18, namely, that the virtual count is B, the conversion factor becomes A/B.

In the next actual counting rate calculating step 24, the counting rate is obtained by measuring the γ ray, actually emitted from the measurement subject 18 by the radiation detector 1. At this time, the positional relationship between the radiation detector 1 and the measurement subject 18 is determined to be equal to the positional relationship virtually recreated on the computer 9. Then, in the radioactivity calculating step 25, the obtained counting rate is multiplied by the conversion factor to calculate the radioactivity of the measurement subject 18. Assuming that the actually obtained counting rate is C, the radioactivity of the measurement subject 18 can be obtained from CxA/B/(emission rate of the γ ray of a radioactive material as a measurement target). This arithmetic operation is executed in the radioactivity calculating means 5 realized by the arithmetic operation processor 6.

As described above, since the conversion factor can be obtained by using the three-dimensional Monte Carlo calculational technique in the method and the apparatus for measuring the radioactivity according to the present invention, the radioactivity of the measurement subject 18 can be rapidly and accurately measured without using a calibration radiation source which must be created in accordance with the measurement subject 18.

The radioactivity concentration measurement method and the radioactivity concentration counting apparatus will now be described.

Figure 4:
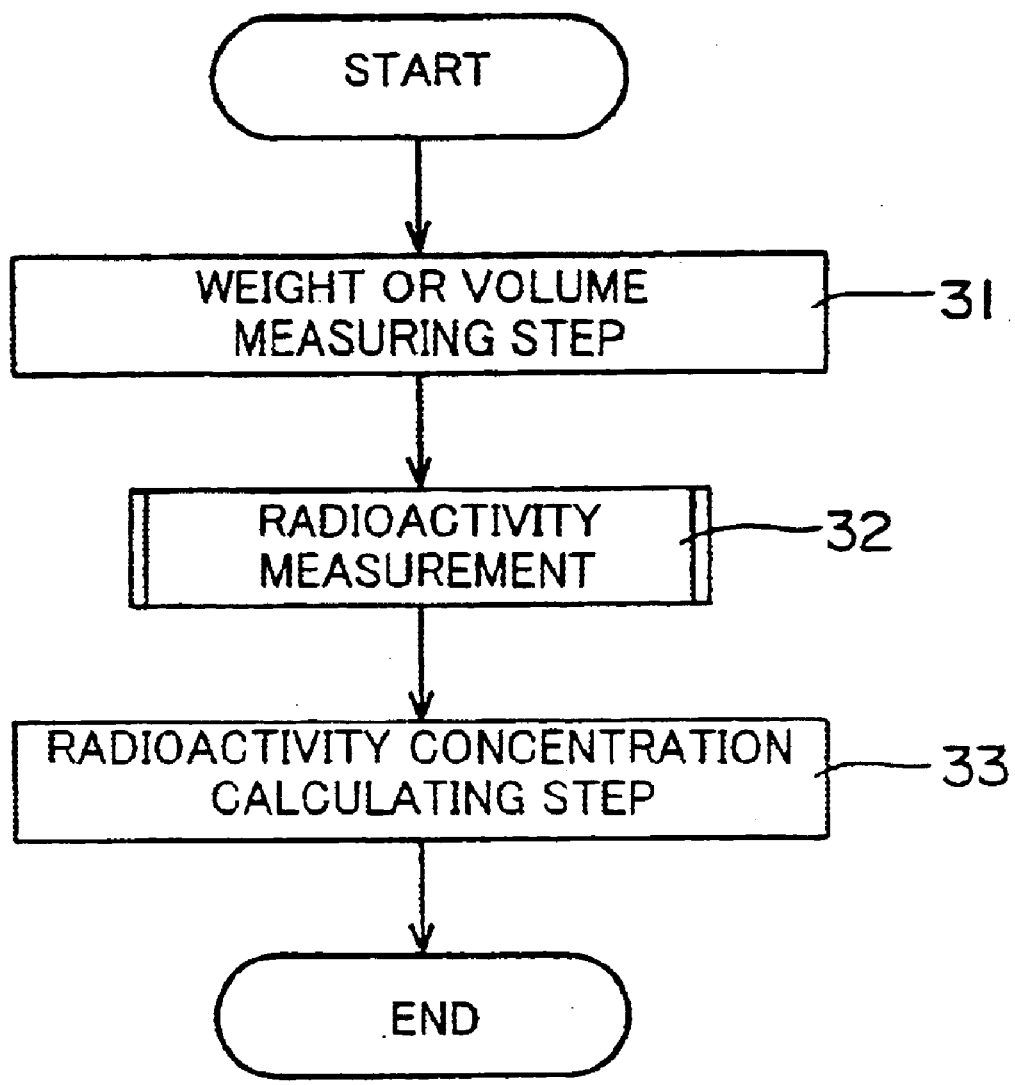
FIG. 4 is a flowchart showing an example of the embodiment of a radioactivity concentration measurement method according to the present invention.
Figure 5:
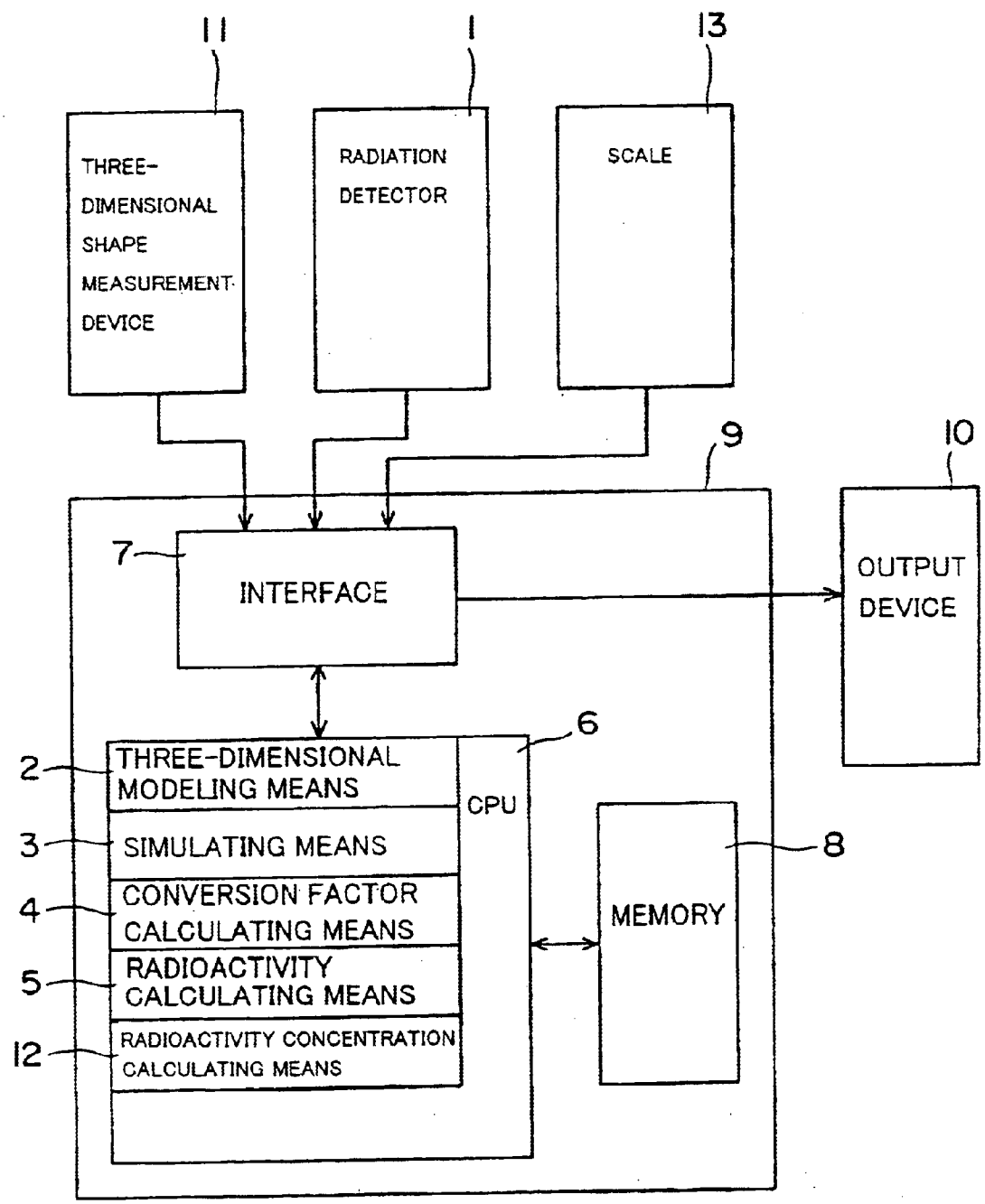
FIG. 5 is a schematic block diagram showing an example of the embodiment of the radioactivity concentration measurement apparatus according to the present invention.

FIG. 4 shows an embodiment of the radioactivity concentration measurement method according to the present invention, and FIG. 5 shows an embodiment of the radioactivity concentration measurement apparatus for carrying out the radioactivity concentration measurement method. This radioactivity concentration measurement apparatus is obtained by adding functions of the weight or volume measuring means 13 and the radioactivity concentration calculating means 12 to the radioactivity measurement apparatus illustrated in FIG. 2.

The radioactivity concentration calculating means 12 calculates the radioactivity concentration by dividing the radioactivity of the measurement subject 18 obtained by the radioactivity calculating mean 5 by a weight or a volume of the measurement subject 18. In this embodiment, for example, the arithmetic operation processor 6 of the computer 9 realizes the radioactivity calculating means 5 by a program for executing the arithmetic operation processing for dividing the radioactivity of the measurement subject 18 by the weight or the volume. Further, the weight or volume measuring means 13 measures a weight or a volume of the measurement subject 18 and is a scale for measuring a weight of the measurement subject 18 in this embodiment. A measurement result obtained by this scale 13 is inputted to the radioactivity concentration calculating means 12 of the computer 9 through the interface 7.

The radioactivity concentration measurement method carried out by such a measurement apparatus includes in the above-described radioactivity measurement method: a weight or volume measuring step 31 for measuring a weight or a volume of the measurement subject 18; and a radioactivity concentration calculating step 33 for calculating the radioactivity concentration by dividing the radioactivity obtained by the above-mentioned radioactivity measurement method by a weight or a volume of the measurement subject 18.

For example, explaining the case where the radioactivity concentration is calculated by a weight, a weight of the measurement subject 18 is first measured by the scale 13 and inputted to the radioactivity concentration calculating means 12 on the computer 9 in the weight or volume measuring step 31 before measuring the radioactivity. Thereafter, in a radioactivity measurement routine 32, the method illustrated in FIG. 1 is carried out and the radioactivity of the measurement subject 18 is measured. Then, in the radioactivity concentration calculating means 12, the radioactivity calculated by the radioactivity calculating means 5 is divided by the weight obtained by the scale 13, thereby calculating the radioactivity concentration (radioactivity concentration calculating step 33). For example, assuming that a weight of the measurement subject 18 is D and the radioactivity is E, the radioactivity concentration can be obtained by E/D. Then, the radioactivity concentration is outputted to the output device 10 and displayed or printed in an arbitrary form.

In this connection, when calculating the radioactivity concentration by a volume in place of a weight, volume measuring means capable of measuring a volume of the measurement subject 18 is used as the weight or volume measuring means 13. The volume measuring means in this case obtains a volume based on the three-dimensional shape data of the measurement subject 18 measured by, e.g., the three-dimensional shape measurement device 11 and usually causes the arithmetic operation processor 6 of the computer 9 to function as the volume measuring means. Assuming that a volume of the measurement subject 18 obtained in this manner is F, E/F is calculated to obtain the radioactivity concentration in the radioactivity concentration calculating step 33.

In the method and the apparatus for measuring the radioactivity concentration according to the present invention, since the radioactivity of the measurement subject 18 is measured without using a calibration radiation source which differs in accordance with each measurement subject 18, the radioactivity concentration of the measurement subject 18 can be rapidly and accurately measured even if the measurement subject 18 differs in shape or dimension.

The method and the apparatus for measuring the radioactivity surface density will now be described.

Figure 6:
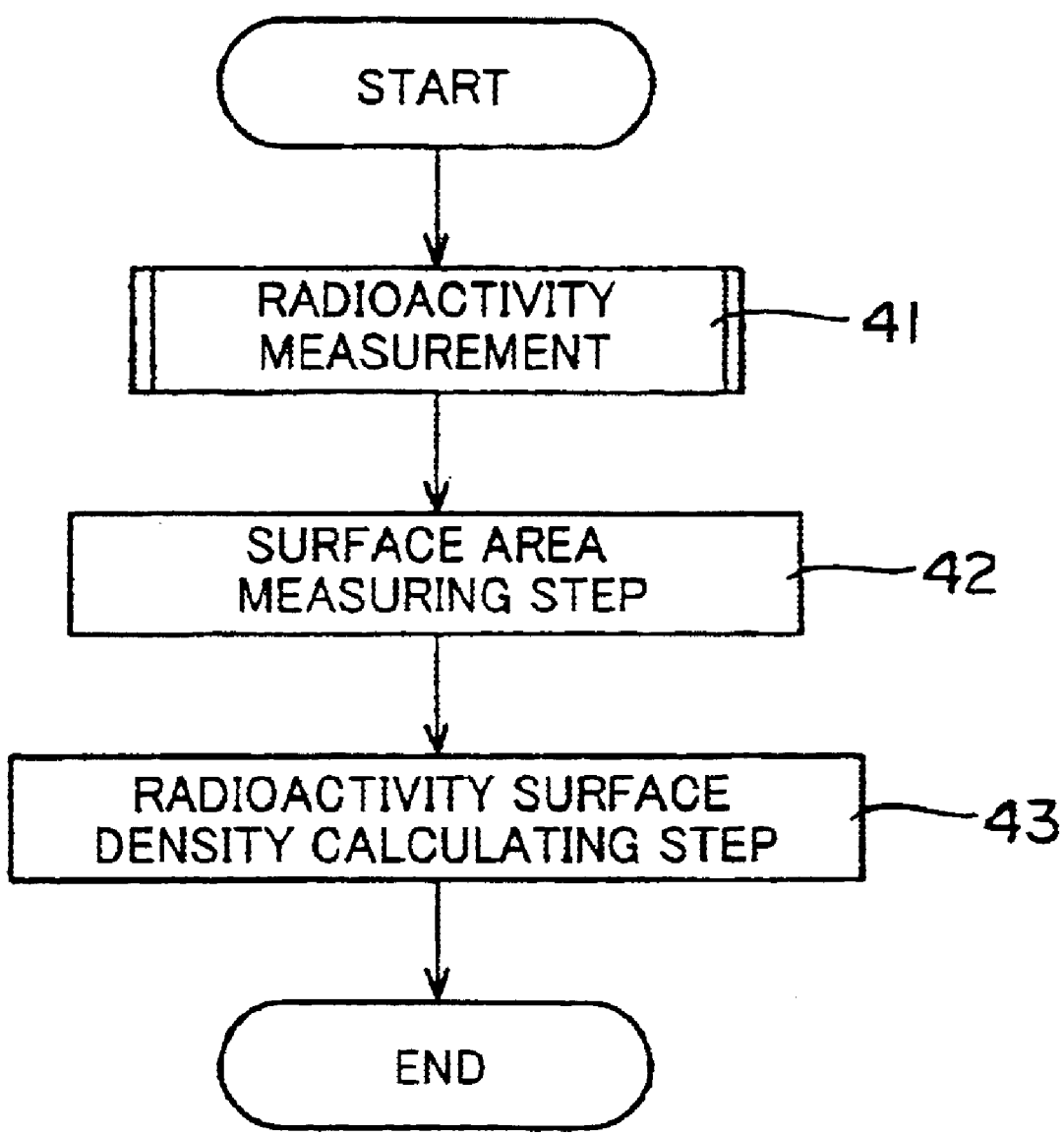
FIG. 6 is a flowchart showing an example of the embodiment of a radioactivity surface density measurement method according to the present invention.
Figure 7:
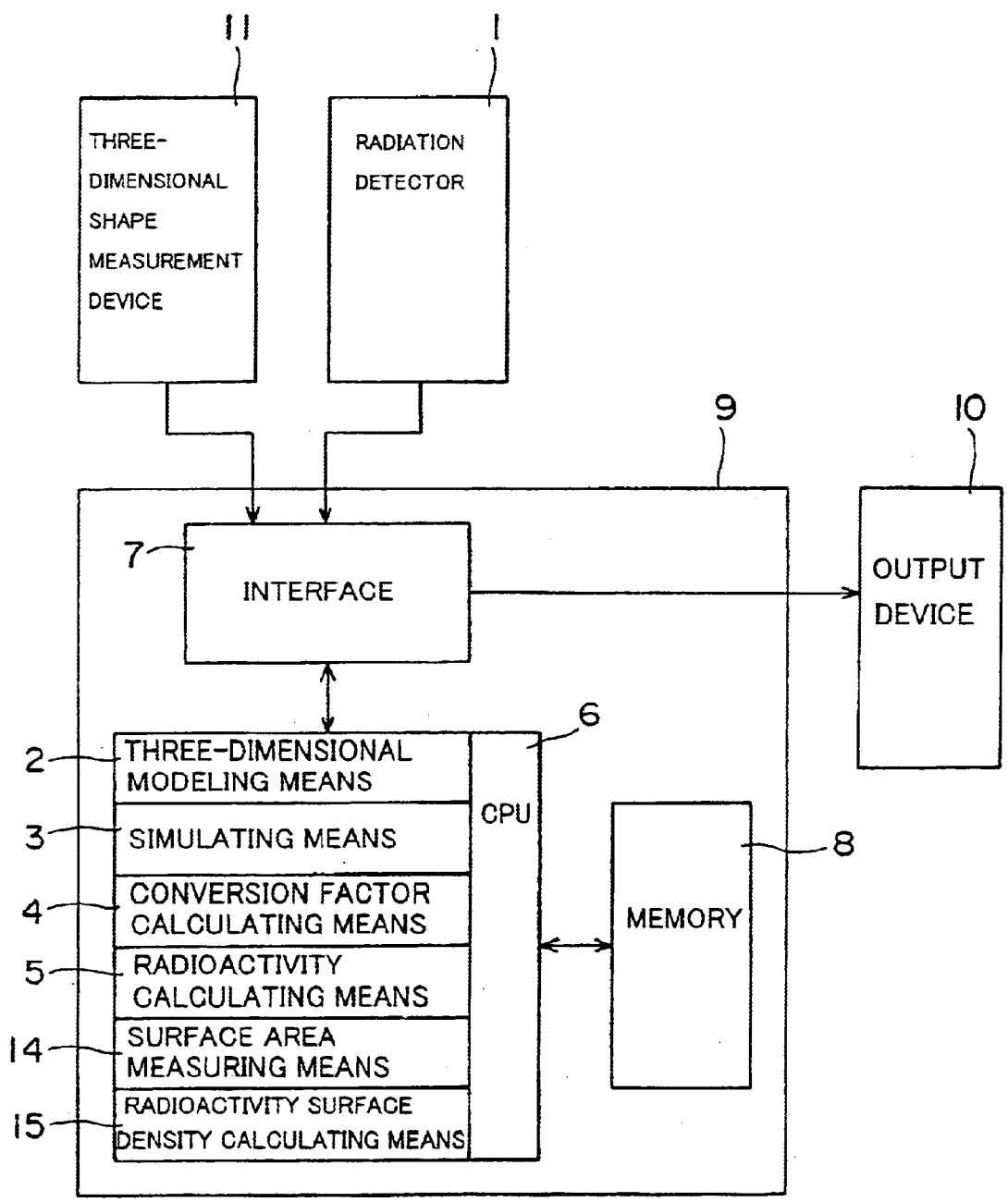
FIG. 7 is a schematic block diagram showing an example of the embodiment of a radioactivity surface density measurement apparatus according to the present invention.

FIG. 6 shows an embodiment of the radioactivity surface density measurement method, and FIG. 7 shows an embodiment of the measurement apparatus for carrying out the radioactivity surface density measurement method. This radioactivity surface density measurement apparatus is obtained by adding functions of surface area measuring means 14 and radioactivity surface density calculating means 15 to the radioactivity measurement apparatus illustrated in FIG. 2, for example.

The radioactivity surface density calculating means 15 calculates the radioactivity surface density by dividing the radioactivity of the measurement subject 18 obtained by the radioactivity calculating means 5 by a surface area and is realized by causing, for example, the arithmetic operation processor 6 of the computer 9 to function as the radioactivity surface density calculating means 15 by a program. Furthermore, the surface area measuring means 14 obtains a surface area from, for example, shape data of the measurement subject 18 measured by the three-dimensional shape measurement apparatus 11. In this embodiment, for example, this is realized by the arithmetic operation processor 6 of the computer 9 caused to function as the surface area measuring means 14 for obtaining a surface area by executing the arithmetic operation based on a predetermined program.

The radioactivity surface density measurement method carried out by such a radioactivity surface density measurement apparatus includes in the radioactivity measurement method mentioned above: a surface area measuring step 42 for measuring a surface area of the measurement subject 18; and a radioactivity surface density calculating step 43 for calculating the radioactivity surface density by dividing the radioactivity obtained by the above-described radioactivity measurement method by a surface area.

Giving concrete description as to this radioactivity surface density measurement method, the radioactivity measurement method illustrated in FIG. 1 is first carried out and the radioactivity of the measurement subject 18 is measured in the radioactivity measurement routine 41. In this case, a radiation ray, for example, a γ ray is virtually generated from the surface of the virtual three-dimensional model 16 of the measurement subject 18 in the virtual count calculating step 22 illustrated in FIG. 1. That is, the surface contamination of the measurement subject 18 is simulated. Then, in the next surface area measuring step 42, a surface area of the measurement subject 18 is calculated based on data concerning the three-dimensional shape of the measurement subject 18 in the surface area measuring means 14 realized by the arithmetic operation processor 6 of the computer 9 and a predetermined arithmetic operation program. Thereafter, in the radioactivity surface density calculating step 43, the radioactivity surface density is calculated by dividing the radioactivity concerning the surface contamination of the measurement subject 18 by the surface area of the measurement subject 18. Assuming that a surface area of the measurement subject 18 is G, the radioactivity surface density can be obtained by E/G. The obtained radioactivity surface density is outputted to the output device 10 and displayed or printed in an arbitrary conformation.

Incidentally, although the surface area of the measurement subject 18 is obtained after calculating the radioactivity of the measurement subject 18 in this radioactivity surface density measurement method, namely, although the surface area measuring step 42 is executed after effecting the radioactivity measurement routine 41, the surface area of the measurement subject 18 may be obtained when the three-dimensional shape of the measurement subject 18 is measured in the virtual modeling step 21 for obtaining the radioactivity of the measurement subject 18, namely, in the virtual modeling step 21 executed in the radioactivity measurement routine 41.

As described above, in the method and the apparatus for measuring the radioactivity surface density according to the present invention, since the radioactivity of the asurement subject 18 is measured without using a calibration radiation source according to each measurement subject 18, the radioactivity surface density of the measurement subject 18 can be rapidly and accurately measured even if the measurement subject 18 differs in shape and dimension. Further, since the radioactivity surface density is measured with the γ ray emitted from the measurement subject 18 as a target, the radioactivity surface density of the inner peripheral surface of, e.g., a narrow tube into which a survey meter can not be inserted can be accurately measured, as different from the case where the radioactivity surface density is measured with the β ray as a target.

Figure 8:
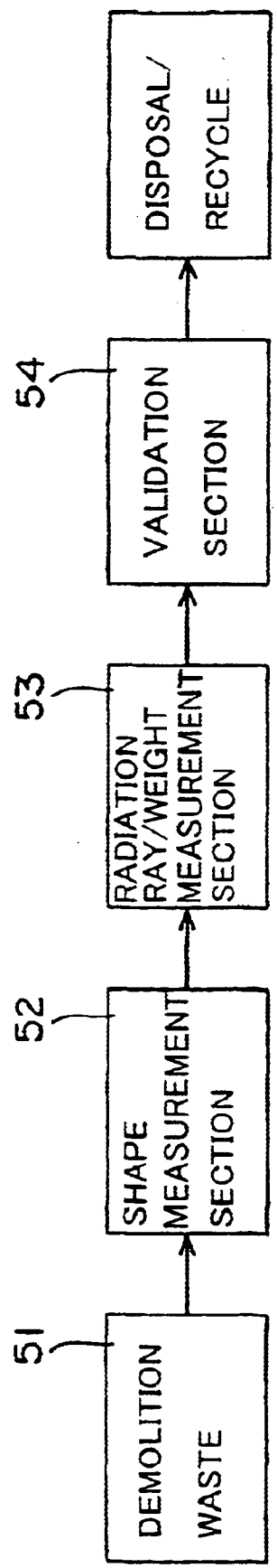
FIG. 8 is a conceptual view showing a system for validating a radioactivity level of a demolition waste generated by nuclear reactor decommissioning.

FIG. 8 shows an example of the concept of a system for validating a radioactivity level of demolition wastes generated by, e.g., the nuclear reactor decommissioning by using the radioactivity concentration measurement method and the radioactivity surface density measurements method mentioned above.

The radioactive wastes 51 (measurement subject 18) having various shapes, dimensions and the radioactivity levels are generated in volume by effecting decommissioning of the nuclear reactor. The radioactive wastes 51 are carried to the shape measurement section 52 and the three-dimensional shape of each Waste is measured by the three-dimensional shape measurement device 11. The radiation detector 1 and the scale 13 are set in the radiation ray/weight measurement section 53, and a weight of the radioactive waste 51 which has been subjected to the shape measurement is measured. Further, radiation rays emitted from the radioactive waste 51 are counted, and the radioactivity concentration and the surface density are obtained. Then, a validation section 54 validates the radioactivity concentration and the radioactivity surface density, and each demolition waste 51 is thereafter appropriately disposed/recycled in accordance with each level. By validating the radioactivity level of the demolition waste 51 in this manner, the demolition waste 51 can be rapidly validated in volume, and it is possible to excellently cope with the disposal/recycle of the demolition waste 51 which is expected to be generated in volume by the future nuclear reactor decommissioning.

Although the above mode is one example of the preferred embodiment according to the present invention, this invention is not restricted thereto, and various modifications can be made without departing from the scope of the invention. For example, in case of counting the virtual γ ray emitted from the three-dimensional model 16 of the measurement subject 18 by the simulation using the three-dimensional Monte Carlo calculational code with the three-dimensional model 17 of the radiation detector 1, the upper and lower three-dimensional models 17 may be determined as an assembly of a plurality of cells, and the incidence of the virtual γ ray may be counted in accordance with each cell.

That is, the radiation detector is conceptualized as an assembly of a plurality of cells and the measurement subject is conceptualized as an assembly of parts opposed to the respective cells. Furthermore, in the virtual modeling step, the virtual three-dimensional model of the radiation detector is made as an assembly of a plurality of cells, and the virtual three-dimensional model of the measurement subject is made as an assembly of parts. Furthermore, the conversion factor setting step is carried out in accordance with each part of the virtual three-dimensional model of the measurement subject to obtain the conversion factor of each cell in accordance with each part. Moreover, the actual counting rate calculating step is carried out in accordance with each cell of the radiation detector to obtain the counting rate for each cell. After obtaining the radioactivity in accordance with each part of the measurement subject by performing the radioactivity calculating step, the radioactivity of the entire measurement subject may be obtained based on the radioactivity of each part.

Figure 9:
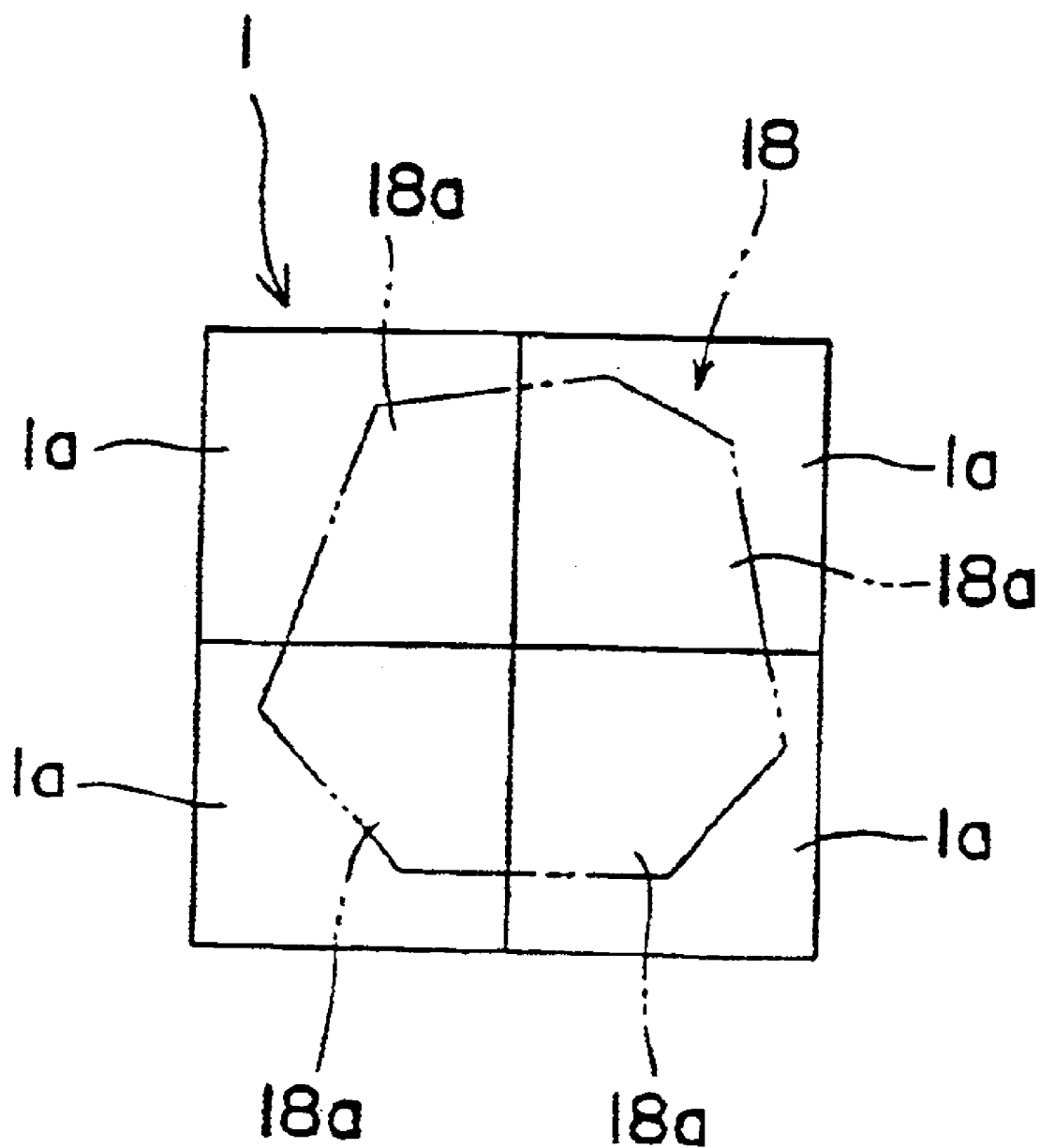
FIG. 9 is a conceptual view of a radiation detector consisting of an assembly of a plurality of cells (radiation detectors)

Giving explanation as to its concrete example, when the radiation detector 1 is configured as an assembly of four cells 1a as shown in FIG. 9 for example, the measurement subject 18 which is mounted on the radiation detector 1 and measured is conceptualized as an assembly of parts 18a opposed to the cells 1a. In addition, it is presupposed that the radioactivity concentration or the radioactivity surface density is even in each part 18a, and the simulation is executed in order to obtain the conversion factor for each cell in accordance with each part of the three-dimensional model.

At first, the counting efficiency (conversion factor) when the radiation ray emitted from a first part of he three-dimensional model 16 is counted by the first to fourth cells of the three-dimensional model 17 is calculated by using the three-dimensional Monte Carlo calculational code based on a measurement result of the shape of the measurement subject 18. It is assumed that, as a result, the efficiency (conversion factor) when counted by the first cell is 0.4, the efficiency (conversion factor) when counted by the second cell is 0.15, the efficiency (conversion factor) when counted by the third cell is 0.15, and the efficiency (conversion factor) when counted by the fourth cell is 0.07.

Similarly, the conversion factors when the radiation rays emitted from the second to fourth parts of the three-dimensional model 16 are counted by the first to fourth cells of the three-dimensional model 17 are calculated by the three-dimensional Monte Carlo calculational code based on the measurement result of the shape of the measurement subject 18. It is assumed that these results are values shown in the following table.

|  | First Part | Second Part | Third Part | Fourth Part |
| --- | --- | --- | --- | --- |
| First Cell | 0.4 | 0.22 | 0.16 | 0.06 |
| Second Cell | 0.15 | 0.45 | 0.08 | 0.14 |
| Third Cell | 0.15 | 0.09 | 0.42 | 0.14 |
| Fourth Cell | 0.07 | 0.22 | 0.16 | 0.38 |

On the other hand, as to the actual counts of the cells 1a of the radiation measurement device 1, it is assumed that the actual count of the first cell 1a is 100, that of the second cell 1a is 50, that of the third cell 1a is 50, and that of the fourth cell 1a is 40.

Expressing the above results in the matrix, the relationship of the radioactivity R1 to R4 for each part 18a and the counting rates of the four cells 1a of the radiation detector 1 can be ex pressed as follows. It is to be noted that the radioactivity of the first part 18a is R1, the radioactivity of the second part 18a is R2, the radioactivity of the third part 18a is R3, and the radioactivity of the fourth part 18a is R4.

$$\begin{bmatrix} 0.4 & 0.22 & 0.16 & 0.06 \\ 0.15 & 0.45 & 0.08 & 0.14 \\ 0.15 & 0.09 & 0.42 & 0.14 \\ 0.07 & 0.22 & 0.16 & 0.38 \end{bmatrix} \begin{bmatrix} R1 \\ R2 \\ R3 \\ R4 \end{bmatrix} = \begin{bmatrix} \text{Counting Rate of 1st Cell} \\ \text{Counting Rate of 2nd Cell} \\ \text{Counting Rate of 3rd Cell} \\ \text{Counting Rate of 4th Cell} \end{bmatrix}$$

When the inverse matrix is multiplied from the left and regulated, the following expression can be obtained:

$$\begin{bmatrix} R1 \\ R2 \\ R3 \\ R4 \end{bmatrix} = \begin{bmatrix} 0.4 & 0.22 & 0.16 & 0.06 \\ 0.15 & 0.45 & 0.08 & 0.14 \\ 0.15 & 0.09 & 0.42 & 0.14 \\ 0.07 & 0.22 & 0.16 & 0.38 \end{bmatrix}^{-1} \begin{bmatrix} \text{Counting Rate of 1st Cell} \\ \text{Counting Rate of 2nd Cell} \\ \text{Counting Rate of 3rd Cell} \\ \text{Counting Rate of 4th Cell} \end{bmatrix}$$

$$= \begin{bmatrix} 0.4 & 0.22 & 0.16 & 0.06 \\ 0.15 & 0.45 & 0.08 & 0.14 \\ 0.15 & 0.09 & 0.42 & 0.14 \\ 0.07 & 0.22 & 0.16 & 0.38 \end{bmatrix}^{-1} \begin{bmatrix} 100 \\ 50 \\ 50 \\ 40 \end{bmatrix}$$

$$= \begin{bmatrix} 3.510775 & -1.73357 & -1.20906 & 0.529797 \\ -1.11460 & 3.264629 & 0.225587 & -1.10987 \\ -1.18016 & 0.515489 & 3.180033 & -1.17516 \\ 0.495486 & -1.78775 & -1.24684 & 3.671353 \end{bmatrix} \begin{bmatrix} 100 \\ 50 \\ 50 \\ 40 \end{bmatrix}$$

$$= \begin{bmatrix} 225.1 \\ 18.7 \\ 19.8 \\ 44.7 \end{bmatrix}$$

As described above, after obtaining the radioactivity R1 to R4 of the first to fourth parts 18a, a sum total of the radioactivity R1 to R4 is calculated. In the above example, the radioactivity of the entire measurement subject 18 becomes 308.3Bq since the following expression is obtained:

Radioactivity of the Entire Measurement Subject 18=R1+R2+R3+R4=225.1+18.7+19.8+44.7=308.3

When the radioactivity concentration or the radioactivity surface density is not even but unevenly distributed at respective positions, the error becomes large with the conversion factor obtained by presupposing the uniform distribution. In particular, when the radioactivity level of the measurement subject 18 is low, the radiation detector 1 must be moved to the measurement subject 18 to effect the measurement. When the measurement is carried out with the radiation detector 1 being moved close to the measurement subject 18, the uneven distribution of the radioactivity largely affects the value of the conversion factor. However, by carrying out the measurement in the above-described manner, the conversion factor can be obtained taking the maldistribution status (uneven distribution) into consideration. Even if the radioactivity of the measurement subject 18 is unevenly distributed, the accurate evaluation of the radioactivity concentration or the radioactivity surface density becomes possible.

In the above concrete example, although the radiation detector 1 is determined as an assembly of the four cells 1a, the number of the cells 1a is not restricted to four. Increase in the number of the cells 1a enables the further detailed evaluation of the distribution of the radioactivity of the measurement subject 18.

In the radioactivity measurement apparatus for carrying out such a method, for example, the radioactivity measurement apparatus shown in FIG. 2, the radiation detector 1 is an assembly of a plurality of cells; the three-dimensional modeling means 2 makes a virtual three-dimensional model of the radiation detector 1 as an assembly of a plurality of cells and a virtual three-dimensional model of the measurement subject as an assembly of parts opposed to the cells; the conversion factor setting means obtains the conversion factor for each cell of the radiation detector in accordance with each part of the measurement subject; and the radioactivity calculating means 5 calculates the radioactivity in accordance with each part of the measurement subject and also calculates the radioactivity of the entire measurement subject based on the radioactivity of each part.

Furthermore, in the above explanation, although the simulation using the three-dimensional Monte Carlo calculational code is carried out to obtain the conversion factor, a method for setting the conversion factor is not restricted thereto. For example, the conversion factor may be obtained by using the shielding calculation code called the point-kernel ray tracing code.

That is, in the conversion factor setting step, the method may be a radioactivity measurement method for obtaining the conversion factor from the correlation of the approximately calculated number of radiation rays before and after passing through a medium based on a thickness of the medium existing between the measurement subject and the radiation detector, an attenuation coefficient of the medium, a buildup factor of the medium, and a distance between the measurement subject and the radiation detector.

Giving concrete description, when the radiation ray emitted from the measurement subject 18 passes through the medium existing between the measurement subject 18 and the radiation detector 1, the relationship of the number of the radiation rays before and after passing through the medium can be approximately obtained by the following expression:

$$I=(1/(4\pi r^2))I_0 B e^{-\mu d}$$

In this expression, I is the number of radiation rays after having passed through a given medium; $I_0$ is the number of radiation rays generated before passing through the given medium; $\mu$ is an attenuation coefficient (cm$^{-1}$); d is a thickness (cm) of a part through which the radiation ray of the measurement subject 18 passes; B is a buildup factor; and r is a distance between the measurement subject and the radiation detector 1. The attenuation coefficient $\mu$ and the buildup factor B are values determined in accordance with a type of the medium, and the thickness d is a value determined in accordance with the conformation of the measurement subject 18 or a position of the radioactive contamination. Moreover, the distance r can be obtained based on the positional relationship between the virtual three-dimensional models 16 and 17 formed in the virtual modeling step 21. It is to be noted that the thickness d may be obtained based on the positional relationship between the virtual three-dimensional models 16 and 17. Calculation is performed by utilizing the above-described expression in the point attenuation nuclear method used for the shielding calculation of the radiation ray.

Since the relationship between I and $I_0$ can be found by the above-described expression, the conversion factor can be obtained in the conversion factor calculating step. That is, $I_0$ corresponds to the number of times of generation of the virtual radiation rays emitted from the virtual three-dimensional model 16 of the measurement subject 18; I corresponds to the number of times of the incidence of the virtual radiation rays upon the virtual three-dimensional model 17 of the radiation detector 1; and $I/I_0$ is the conversion factor. After obtaining the conversion factor, the radioactivity of the measurement subject is calculated by the procedure similar to the above case, and the radioactivity concentration or the radioactivity surface density is obtained. In this radioactivity measurement method, although the measured radioactivity is an approximate value, the radioactivity can be easily obtained in a short time since a calculation amount is small.

As shown in FIG. 10, the radioactivity measurement apparatus for carrying out this method is constituted by including: the radiation detector 1 for counting the radiation ray emitted from the measurement subject 18; the conversion factor setting means 19 for calculating the conversion factor from the correlation of the approximately calculated number of the radiation rays before and after passing through a medium based on a thickness of the medium existing between the measurement subject 18 and the radiation detector 1, an attenuation coefficient of the medium, a buildup factor of the medium, and a distance between the measurement subject 18 and the radiation detector 1; and the radioactivity calculating means 5 for calculating the actual radioactivity of the measurement subject from the actual counting rate by the radiation detector 1 and the conversion factor. In addition, by adding functions of the weight or volume measuring means 13 and the radioactivity concentration calculating means 12 shown in FIG. 5 to, for example, the measurement apparatus shown in FIG. 10, the radioactivity concentration measurement apparatus can be constituted. Additionally, the radioactivity surface density measurement apparatus can be configured by adding functions of the surface area measuring means 14 and the radioactivity surface density calculating means 15 depicted in FIG. 7 to, for example, the measurement device shown in FIG. 10.

Further, even when the conversion factor is obtained by using the point-kernel ray tracing code and performing the simulation, the incidence of the virtual γ ray may be counted in accordance with each cell with each of the upper and lower three-dimensional models 17 being determined as an assembly of a plurality of cells, as similar to the case where the conversion factor is obtained by using the three-dimensional Monte Carlo calculation code and effecting the simulation.

What is claimed is:

1. A method for measuring radioactivity comprising: a virtual modeling step for arranging virtual three-dimensional models of a measurement subject and a radiation detector in a virtual three-dimensional space with a positional relationship equal to an actual geometric positional relationship; a conversion factor setting step for associating a number of times of generation of a virtual radiation ray emitted from said virtual three-dimensional model of said measurement subject with a number of times of incidence of said virtual radiation ray upon said virtual three-dimensional model of said radiation detector and obtaining a conversion factor; an actual counting rate calculating step for actually counting incidence of said radiation ray emitted from said measurement subject upon said radiation detector and calculating a counting rate; and a radioactivity calculating step for calculating radioactivity of said measurement subject from said counting rate and said conversion factor.

2. A method for measuring radioactivity according to claim 1, wherein said conversion factor setting step includes: a virtual count calculating step for randomly generating a virtual radiations ray from said virtual three-dimensional model of said measurement subject by utilizing a Monte Carlo calculational technique and counting the incidence of said virtual radiation ray upon said virtual three-dimensional model of said radiation detector to determine a resulting count as a virtual count; and a conversion factor calculating step for calculating a conversion factor from a number of times of generation of said virtual radiation ray and said virtual count.

3. A method for measuring radioactivity according to claim 1, wherein said conversion factor setting step obtains said conversion factor from correlation of an approximately calculated number of radiation rays before and after passing through a medium existing between said measurement subject and said radiation detector based on a thickness of said medium, an attenuation coefficient of said medium, a buildup factor of said medium, and a distance between said measurement subject and said radiation detector.

4. A method for measuring radioactivity according to claim 1, wherein said radiation detector is conceptualized as an assembly of a plurality of cells and said measurement subject is conceptualized as an assembly of parts opposed to said cells a virtual three-dimensional model of said radiation detector is made as an assembly of a plurality of cells and a virtual three-dimensional model of said measurement subject is made as an assembly of said parts in said virtual modeling step; said conversion factor setting step is carried out in accordance with each part of said virtual three-dimensional model of said measurement subject to obtain a conversion factor for each of said cells in accordance with each part; said actual counting rate calculating step is performed in accordance with each cell of said radiation detector to obtain a counting rate for said each cell; said radioactivity calculating step is effected to obtain radioactivity according to each part of said measurement subject, and radioactivity of said entire measurement subject is thereafter obtained from the radioactivity of each part.

5. A method for measuring radioactivity concentration according to claim 1, comprising: a weight or volume measuring step for measuring a weight or a volume of a measurement subject; and a radioactivity concentration calculating step for obtaining the radioactivity concentration by dividing the radioactivity obtained by said method for measuring radioactivity by said weight or said volume.

6. A method for measuring radioactivity surface density according to claim 1, comprising: a surface area measuring step for measuring a surface area of a measurement subject; and a radioactivity surface density calculating step for obtaining radioactivity surface density by diving radioactivity obtained by said method for measuring radioactivity by said surface area.

7. An apparatus for measuring radioactivity comprising: a radiation detector for counting a radiation ray emitted from a measurement subject; three-dimensional modeling means for fetching three-dimensional space coordinates of a surface of said measurement subject and virtually recreating a geometric positional relationship between said measurement subject and said radiation detector by utilizing said fetched coordinates; conversion factor setting means for associating a number of times of generation of a virtual radiation ray emitted from a virtually recreated three-dimensional model of said measurement subject with a number of times of incidence upon a virtual recreated three-dimensional model of said radiation detector to obtain a conversion factor; and radioactivity calculating means for calculating actual radioactivity of said measurement subject from an actual counting rate by said radiation detector and said conversion factor.

8. An apparatus for measuring radioactivity according to claim 7, wherein said conversion factor setting means includes: simulating means for randomly generating a virtual radiation ray from said three-dimensional model of said measurement subject by utilizing a three-dimensional Monte Carlo calculational code and pseudo-recreating incidence upon a virtually recreated three-dimensional model of said radiation detector; and conversion factor calculating means for calculating a conversion factor from a number of times of generation of said virtual radiation ray and a count of the incidence of said virtual radiation ray upon said three-dimensional model of said radiation detector.

9. An apparatus for measuring radioactivity according to claim 7, wherein said conversion factor setting means calculates said conversion factor from correlation of an approximately calculated number of radiation rays before and after passing through a medium existing between said measurement subject and said radiation detector based on a thickness of said medium, an attenuation coefficient of said medium, a buildup factor of said medium, and a distance between said measurement subject and said radiation detector.

10. An apparatus for measuring radioactivity according to claim 7, wherein said radiation detector is an assembly of a plurality of cells; said three-dimensional modeling means makes a virtual three-dimensional model of said radiation detector as an assembly of a plurality of cells and makes a virtual three-dimensional model of said measurement subject as an assembly of parts opposed to said cells; said conversion factor setting means obtains a conversion factor for each cell of said radiation detector in accordance with each part of said measurement subject; and said radioactivity calculating means obtains radioactivity in accordance with each part of said measurement subject and obtains radioactivity of said entire measurement subject from the radioactivity of each part.

11. An apparatus for measuring radioactivity concentration according to claim 7, comprising: weight or volume measuring means for measuring a weight or a volume of a measurement subject; and radioactivity concentration calculating means for calculating radioactivity concentration by diving the obtained radioactivity of said measurement subject by said weight or said volume.

12. An apparatus for measuring radioactivity surface density according to claim 7, comprising: surface area measuring means for measuring a surface area of a measurement subject; and radioactivity surface density calculating means for calculating radioactivity surface density by dividing the obtained radioactivity of said measurement subject by said surface area.

\* \* \* \* \*